Feb. 17, 1925. 1,527,097
C. WATSON
REVERSIBLE WINDMILL
Filed Nov. 5, 1923 2 Sheets-Sheet 1

Claude Watson
INVENTOR

BY *Victor J. Evans*
ATTORNEY

WITNESSES
R. A. Thomas

Feb. 17, 1925.

C. WATSON 1,527,097

REVERSIBLE WINDMILL

Filed Nov. 5, 1923      2 Sheets-Sheet 2

Claude Watson, INVENTOR

WITNESSES          ATTORNEY

Patented Feb. 17, 1925.

1,527,097

UNITED STATES PATENT OFFICE.

CLAUDE WATSON, OF DANVILLE, ILLINOIS.

REVERSIBLE WINDMILL.

Application filed November 5, 1923. Serial No. 672,984.

*To all whom it may concern:*

Be it known that I, CLAUDE WATSON, a citizen of the United States, residing at Danville, in the county of Vermilion and State of Illinois, have invented new and useful Improvements in Reversible Windmills, of which the following is a specification.

This invention relates to power devices, particularly to windmills or windwheels and has for its object the provision of a novel windwheel provided with rudder controlled cam means for feathering the blades as they are moved into the eye of the wind.

An important object is the provision of a device of this character in which the blade moving mechanism is entirely automatic in action so that the device will operate without any necessity for attention or adjustment.

An additional object is the provision of a structure of this character which will be simple and inexpensive in manufacture, highly efficient in use, durable in service and a general improvement in the art.

Figure 1:
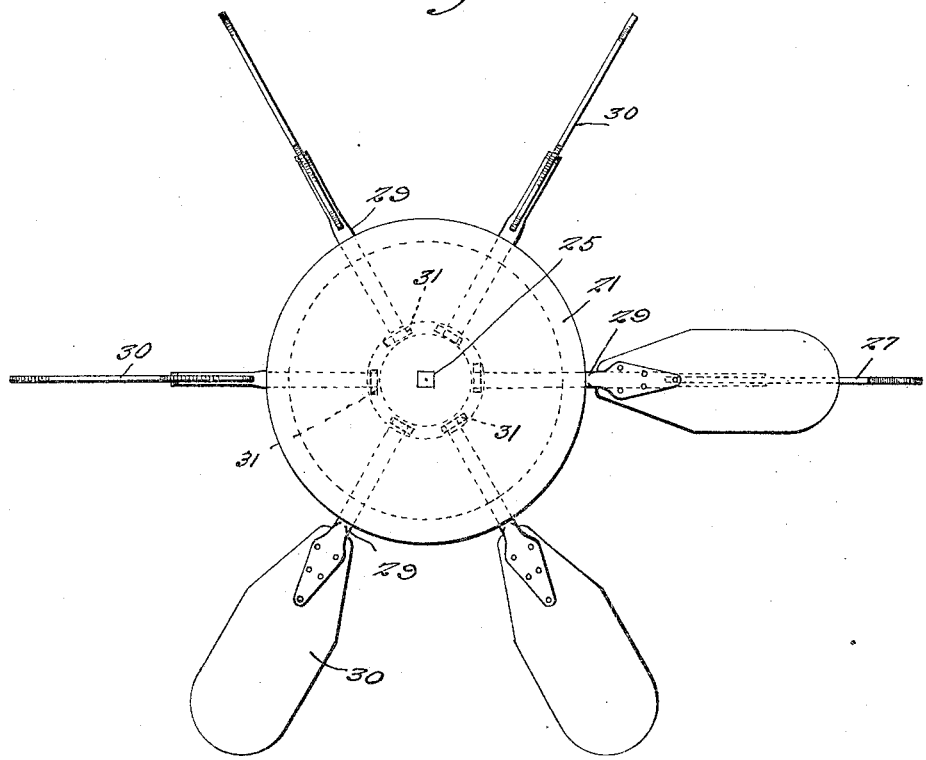
Figure 5:
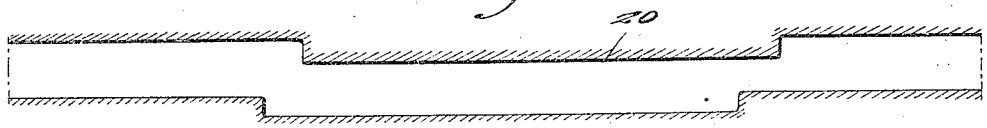
Figure 4:
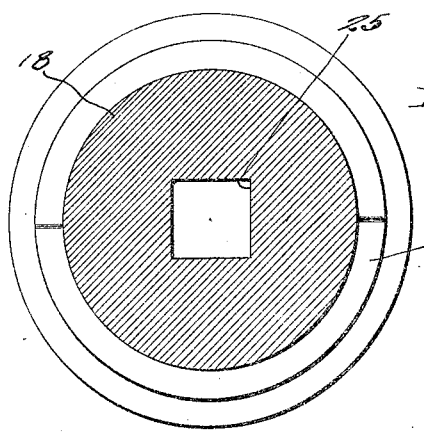
Figure 2:
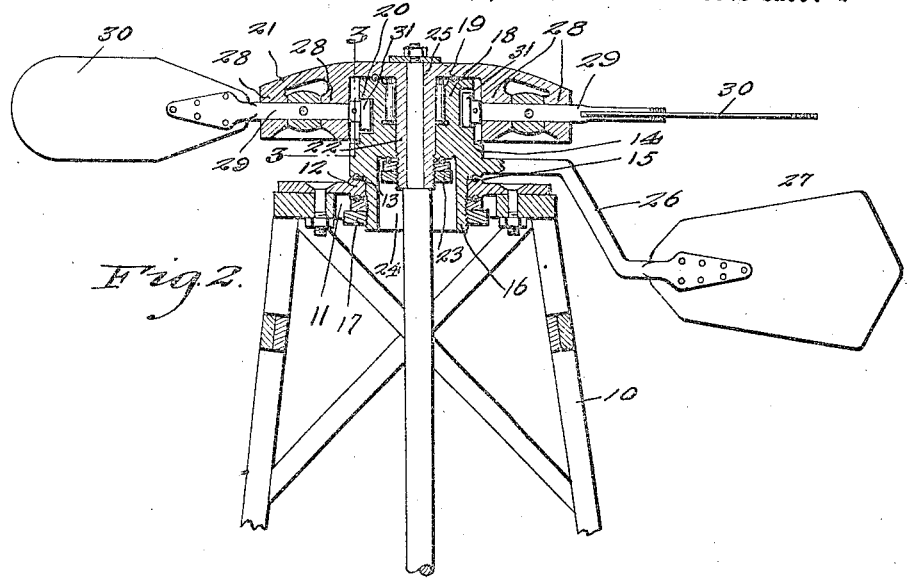
Figure 3:
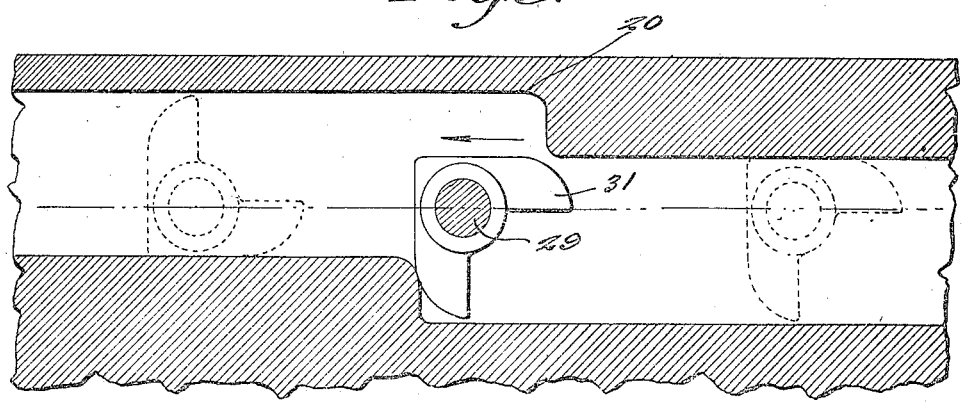

With the above and other objects and advantages in view the invention consists in the details of construction to be hereinafter more fully described and claimed and illustrated in the accompanying drawings, in which:

Figure 1 is a plan view of a windwheel constructed in accordance with my invention, Figure 2 is a cross section therethrough, Figure 3 is a detail section on the line 3—3 of Figure 2, The remaining two figures are detail views.

Referring more particularly to the drawings the numeral 10 designates a portion of a stationary support which might be a tower or other similar structure. This stationary support is provided with a circular opening 11 surrounded by an upstanding enlargement 12 formed with a race containing a plurality of bearing balls 13. Rotatable upon this support is the windwheel which is disposed in a horizontal plane and which includes a hub 14 having a shoulder 15 formed with a race receiving the balls 13. This hub further includes a reduced extension 16 which passes downwardly through the hole 11. The head is prevented from displacement with respect to the support by a nut 17 which is screwed onto the projecting lower end of the extension 16, which nut engages beneath the top portion of the support 10. The intermediate portion of the hub is reduced at 18 and the upper end is formed with a race containing bearing balls 19. Formed at the intermediate portion of the hub is a cam track 20 formed as shown more clearly in Figure 3.

The head further includes a circular body 21 which rests upon the balls 19 and which is formed with a suitable race receiving the same. At its center the body 21 is formed with a bore 22 which extends downwardly through the hub 14 and 16 and held in place by a nut 23 screwed upon its lower end and engaging within a chamber 24 in the hub. The central extension 22 has a bore 25 within which may be secured a shaft to be rotated.

Suitably connected with the hub is an arm 26 which carries a rudder 27 which is acted upon by the wind and which will cause the hub to be rotated.

The body member 21 is formed with two series of outer and inner bearings 28 through which are journaled shafts 29 carrying blades 30. At their inner ends these shafts carry cams 31 which co-operate with the sides of the track 20 so that at a certain point the blades will be shifted from their normal or vertical position to a horizontal position for feathering when moving against the wind.

In the operation it is of course apparent that the rudder 27 will always move the hub so that the cam track 20 thereon will be in the proper position to feather the blades when they have moved to a position opposite the direction of the wind and to maintain these blades in such feathered position until they reach the point where the wind may again impinge them for rotating the wheel. The action is entirely automatic regardless of the direction from which the wind is blowing as the rudder takes care of this detail.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In a windwheel, a stationary support, a hub rotatably mounted and formed with a cam groove, a rudder carried by said hub, a wheel body journally mounted on the hub, a plurality of shafts journaled through the wheel body and provided with blades at their outer ends, and cams on the inner ends of said shafts movable along the cam groove whereby the blades will be shifted from vertical to horizontal position and vice versa at selected points.

2. In a windmill, a stationary support having a bearing therein, a member rotatably mounted upon the support and having an extension extending through said bearing, said rotatable member being formed in its periphery with a cam-groove and carrying a rudder, a hub member engaged upon said rotatable member and recessed for the accommodation thereof, said hub member having a depending central portion rotatable axially through the rotatable member, a plurality of shafts journaled through said hub member radially thereof, blades on the outer ends of said shafts, and cams on the inner ends of said shafts engaged within said cam groove.

In testimony whereof I affix my signature.

CLAUDE WATSON.